(12) United States Patent
Yoon et al.

(10) Patent No.: US 12,485,739 B2
(45) Date of Patent: Dec. 2, 2025

(54) VEHICLE BATTERY CASE

(71) Applicants:Hyundai Motor Company, Seoul (KR); Kia Corporation, Seoul (KR); HYUNDAI STEEL COMPANY, Incheon (KR); SEOJIN INDUSTRIAL Co., Ltd., Gunpo-si (KR)

(72) Inventors: Sung Ho Yoon, Seoul (KR); Uk Heo, Incheon (KR); Han Young Hwang, Ansan-si (KR); Sang Pil Park, Gunpo-si (KR)

(73) Assignees: HYUNDAI MOTOR COMPANY, Seoul (KR); KIA CORPORATION, Seoul (KR); HYUNDAI STEEL COMPANY, Incheon (KR); SEOJIN INDUSTRIAL CO., LTD., Gunpo-si (KR)

( * ) Notice: Subject to any disclaimer, the term of this patent is extended or adjusted under 35 U.S.C. 154(b) by 347 days.

(21) Appl. No.: 18/116,482

(22) Filed: Mar. 2, 2023

(65) Prior Publication Data

US 2024/0075798 A1 Mar. 7, 2024

(30) Foreign Application Priority Data

Sep. 2, 2022 (KR) .................. 10-2022-0111599

(51) Int. Cl.
*B60K 1/04* (2019.01)
*H01M 50/242* (2021.01)
*H01M 50/249* (2021.01)

(52) U.S. Cl.
CPC ............. *B60K 1/04* (2013.01); *H01M 50/242* (2021.01); *H01M 50/249* (2021.01); *H01M 2220/20* (2013.01)

(58) Field of Classification Search
CPC ............. B60K 1/04; B60K 2001/0438; H01M 20/249; H01M 2220/20; H01M 20/244; Y02E 60/10
See application file for complete search history.

(56) References Cited

U.S. PATENT DOCUMENTS

| 10,720,620 B1 * | 7/2020 | Grace ................. H01M 50/244 |
| 10,773,582 B2 | 9/2020 | Steiner et al. |
| 2021/0320366 A1 | 10/2021 | Hashimoto |

FOREIGN PATENT DOCUMENTS

| JP | 2017-196952 A | 11/2017 |
| KR | 10-2015-0121322 A | 10/2015 |

(Continued)

*Primary Examiner* — Jason D Shanske
*Assistant Examiner* — James J Triggs
(74) *Attorney, Agent, or Firm* — Morgan, Lewis & Bockius LLP

(57) ABSTRACT

Disclosed is a vehicle battery case including: a case body in which a vehicle battery is contained; and a side portion extending in a longitudinal direction of a vehicle and coupled to a side of the case body, thereby protecting a side of the vehicle battery. The side portion includes: a lower panel extending outwards from the case body and having multiple first protrusions formed to protrude upwards; an upper panel disposed above the lower panel and extending outwards from the case body so as to form a closed section together with the lower panel; and a reinforcement panel disposed between the upper panel and the lower panel so as to extend outwards from the case body, thereby reinforcing rigidity of the side portion together with the lower panel and the upper panel.

12 Claims, 6 Drawing Sheets

(56) References Cited

FOREIGN PATENT DOCUMENTS

| | | |
|---|---|---|
| KR | 10-2021-0058151 A | 5/2021 |
| KR | 10-2299556 B1 | 9/2021 |
| KR | 10-2022-0145985 A | 11/2022 |

\* cited by examiner

VEHICLE BATTERY CASE

CROSS-REFERENCE TO RELATED APPLICATION(S)

This application is based on and claims priority under U.S.C. 119 to Korean Patent Application No. 10-2022-0111599, filed on Sep. 2, 2022, in the Korean Intellectual Property Office, the disclosure of which is herein incorporated by reference in its entirety.

BACKGROUND

The present disclosure relates to a vehicle battery case wherein the side portion of a housing in which a battery is mounted has an impact-absorbing space formed by an upper panel and a lower panel, thereby securing lateral collision rigidity.

TECHNICAL FIELD

A vehicle battery case refers to a device for storing a battery module used for a vehicle and protecting the battery from external environments and collisions. In general, an electric car having a traveling distance of 400 km or more has a battery capacity of 60 kWh or more. In this case, the protective device for protecting the battery module is made of aluminum for light weightness.

In the case of an electric car having a traveling distance of less than 400 km, steel is partially used. However, a simple structure to be mounted on the lower side portion of the chassis (having shapes of slabs and angles tubes) is used. This poses a problem in that it is difficult to protect the battery module from collisions or compression loads.

That is, a battery case made of steel is not favorable to light weightness and is vulnerable to buckling in the case of a lateral collision and when an external force is applied thereto. Therefore, it is necessary to develop a vehicle battery case capable of securing lateral collision rigidity while using a steel material.

The above descriptions regarding background technologies have been made only to help understanding of the background of the present disclosure, and are not to be deemed by those skilled in the art to correspond to already-known prior arts.

SUMMARY

The present disclosure has been proposed to solve the above-mentioned problems, and may provide a vehicle battery case wherein an impact-absorbing space is formed in a side portion of a housing in which a battery is mounted, a bead is provided to protrude upwards and to extend outwards, and lateral collision rigidity is secured by a reinforcement panel having a third protrusion formed in the impact-absorbing space so as to correspond to the bead, thereby preventing buckling deformation.

A vehicle battery case according to the present disclosure includes: a case body in which a vehicle battery is contained; and a side portion extending in a longitudinal direction of a vehicle and coupled to a side of the case body, thereby protecting a side of the vehicle battery.

The side portion may include: a lower panel extending outwards from the case body and having multiple first protrusions formed to protrude upwards; an upper panel disposed above the lower panel and extending outwards from the case body so as to form a closed section together with the lower panel; and a reinforcement panel disposed between the upper panel and the lower panel so as to extend outwards from the case body, thereby reinforcing rigidity of the side portion together with the lower panel and the upper panel.

The side portion may further include a side panel disposed between the lower panel, and the upper panel, the side panel including multiple second protrusions bent so as to protrude to the outside of the vehicle.

The lower panel and the upper panel may extend from the multiple second protrusions of the side panel to the outside of the vehicle.

A pair of second protrusions of the multiple second protrusions may be formed to be spaced apart one above the other on the side panel, the lower panel may extend from a lower second protrusion of the pair of second protrusions, and the upper panel may extend from an upper second protrusion of the pair of second protrusions, the upper second protrusion is spaced above the lower second protrusion.

An end portion of the upper panel extending from the side panel may have a first bending portion that bends downwards, an end portion of the lower panel may have a second bending portion that bends upwards, and the first and second bending portions may be connected to form a closed section.

The first bending portion may be positioned more outwardly than the second bending portion.

The reinforcement panel may include multiple third protrusions protruding upwards, at least one of the multiple third protrusions positioned to correspond to at least one first protrusion of the multiple first protrusions formed on the lower panel, and extending to the outside of the vehicle.

The multiple first protrusions may be disposed to be spaced apart in the forward or backward direction of the vehicle, and the multiple third protrusions may be formed and positioned to correspond to the multiple first protrusions.

The side portion may further include a side panel disposed between the lower panel, and the upper panel, the side panel including multiple second protrusions bent so as to protrude to the outside of the vehicle, and at least one third protrusion of the multiple third protrusions may be disposed between a pair of second protrusions of the multiple second protrusions.

The vehicle battery case may further include multiple pipe members penetrating the lower panel, the upper panel, and the reinforcement panel and connecting with a chassis, while being disposed to be spaced apart in the forward or backward direction of the vehicle.

The first protrusion may include multiple first protrusions comprise multiple 1-1 protrusions and multiple 1-2 protrusions, each 1-1 protrusion extending from the case body to an end of the lower panel and each 1-2 protrusion protruding from the case body toward the pipe members, and the multiple 1-1 protrusions and the multiple 1-2 protrusions may be disposed alternately while being spaced apart from each other.

The reinforcement panel may include third protrusions protruding upwards while being positioned to correspond to the first protrusions formed on the lower panel, at least one third protrusion of the third protrusions positioned above at least one 1-1 protrusion of the multiple 1-1 protrusions may extend by a length of extension of the at least one 1-1 protrusion, and at least one third protrusion of the third protrusions positioned above at least one 1-2 protrusion of the multiple 1-2 protrusions may be formed on a vehicle outside end so as to bend downwards.

A vehicle battery case according to the present disclosure is advantageous as follow: the same includes a wall panel surrounding the side of the case body, and a side panel coupled to the wall panel and provided with a second protrusion formed to protrude; an upper panel and a lower panel extend from the side panel to the outside of the vehicle; the upper panel and the lower panel primarily absorb an impact, and the side panel secondarily absorbs a collision, thereby safely protecting the vehicle battery.

In addition, a first protrusion protruding upwards from the upper surface of the lower panel and a reinforcement panel disposed between the upper panel and the lower panel may together form rigidity inside the distancing space between the upper panel and the lower panel, thereby preventing buckling deformation of the side portion during a lateral collision.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
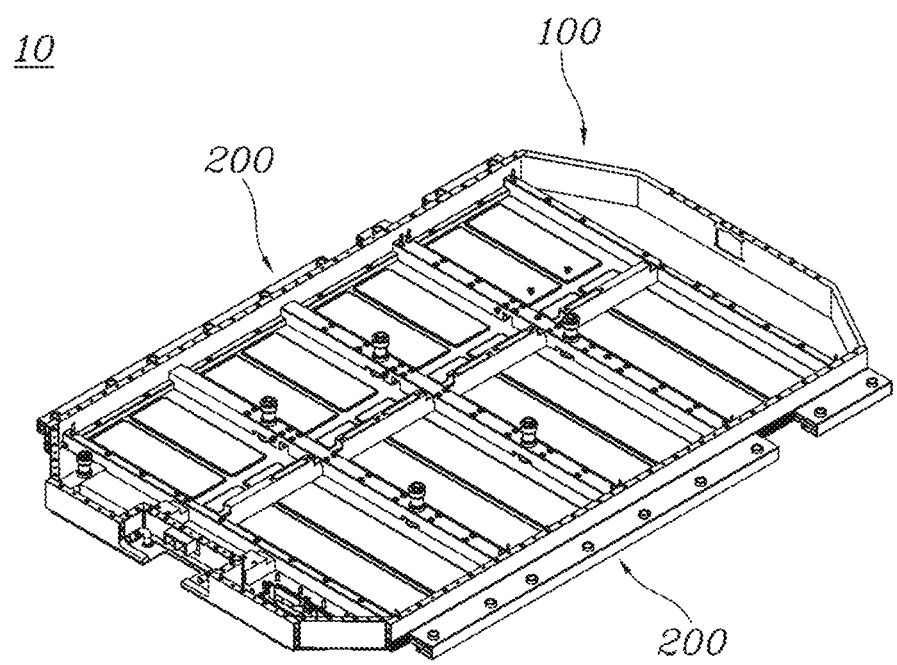
FIG. 1 is a perspective view of a vehicle battery case according to an embodiment of the present disclosure.

A specific structural or functional description of embodiments of the present disclosure disclosed in the specification or application is given merely for the purpose of describing the embodiment according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure, and therefore particular embodiments will be illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure.

Such terms as "a first" and/or "a second" may be used to described various elements, but the elements should not be limited by these terms. These terms are intended merely to distinguish one element from other elements. For example, a first element may be named a second element and similarly a second element may be named a second element without departing from the scope of protection of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to any other component, it should be understood that there is no component therebetween. The other expressions of describing a relation between structural elements, i.e., "between" and "merely between" or "neighboring" and "directly neighboring", should be interpreted similarly to the above description.

The terms used in the present disclosure are merely used to describe specific embodiments, and are not intended to limit the present disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

Hereinafter, exemplary embodiments of the present disclosure will be described in detail with reference to the accompanying drawings. In the respective drawings, identical or like reference signs denote identical or like components.

Figure 2:
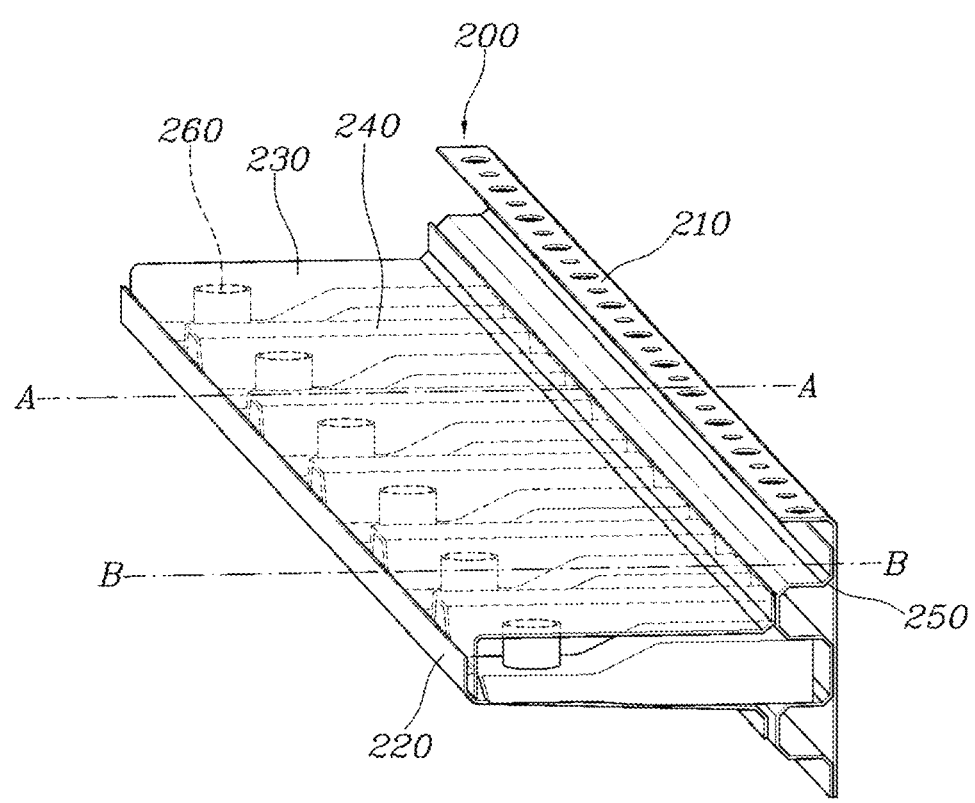
FIG. 2 is a perspective view of a side portion included in a vehicle battery case according to an embodiment of the present disclosure.
Figure 3:
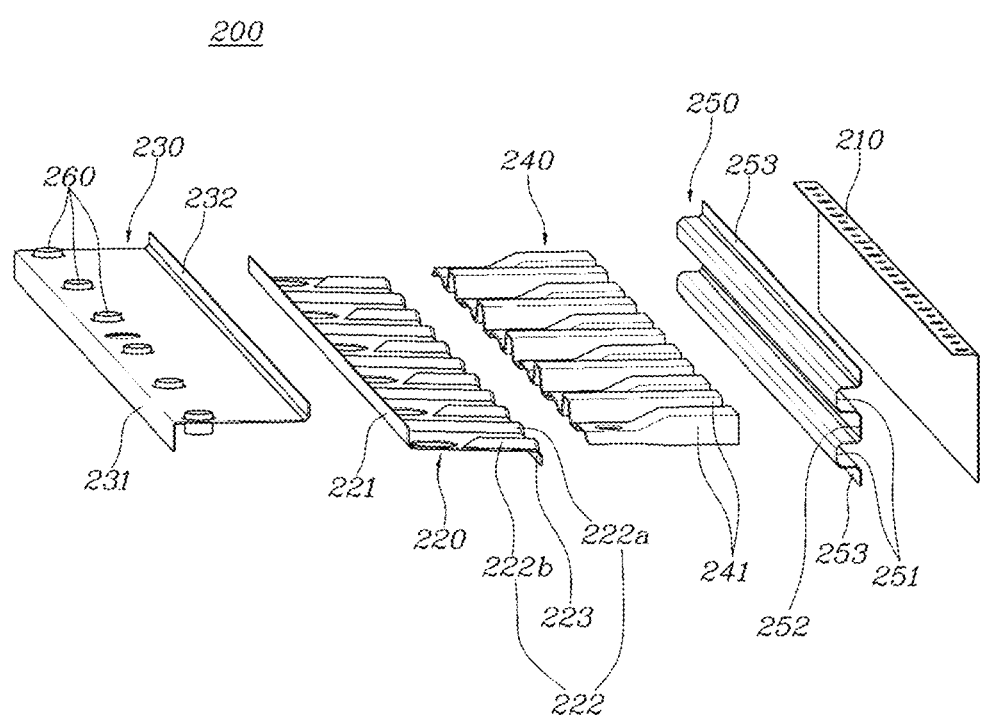
FIG. 3 is an exploded perspective view of a side portion included in a vehicle battery case according to an embodiment of the present disclosure.
Figure 4:
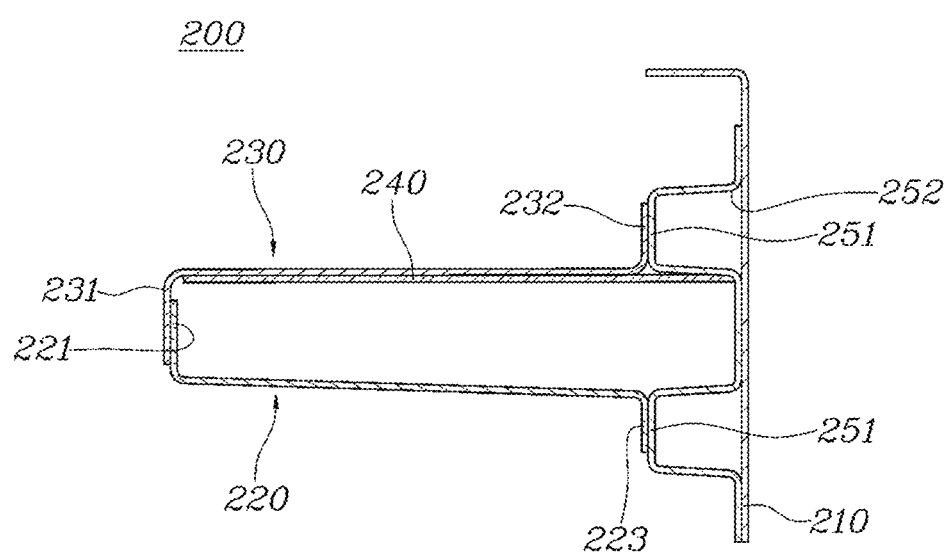
FIG. 4 is a sectional view taken along A-A in FIG. 2.
Figure 6:
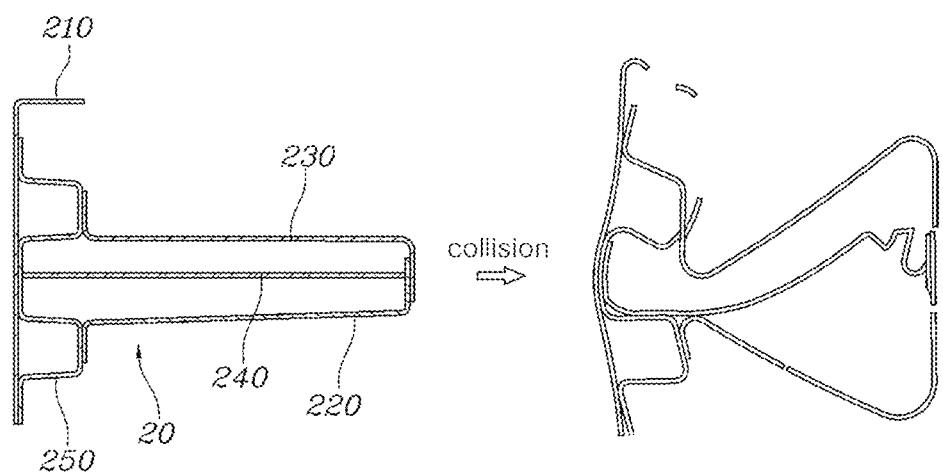
FIG. 6 is a sectional view illustrating a collision of a side portion included in a vehicle battery case according to an embodiment of the present disclosure.

FIG. 1 is a perspective view of a vehicle battery case according to an embodiment of the present disclosure. FIG. 2 is a perspective view of a side portion 200 included in a vehicle battery case 10 according to an embodiment of the present disclosure. FIG. 3 is an exploded perspective view of a side portion 200 included in a vehicle battery case according to an embodiment of the present disclosure. FIG. 4 is a sectional view taken along A-A in FIG. 2. FIG. is a sectional view taken along B-B in FIG. 2. FIG. 6 is a sectional view illustrating a collision of a side portion 200 included in a vehicle battery case 10 according to an embodiment of the present disclosure.

An exemplary embodiment of a vehicle battery case 10 according to the present disclosure will now be described with reference to FIG. 1 to FIG. 6.

In general, an electric vehicle may have a battery mounted on the lower portion of the vehicle, unlike internal combustion engine vehicles. Impacts applied to the front and rear sides of the battery may be absorbed by front and rear bumpers of the vehicle, thereby protecting the battery, but the vehicle battery is highly likely to be damaged by a lateral collision.

The present disclosure relates to the side structure of a vehicle battery case for protecting sides of a vehicle battery mounted on the lower portion of an electric vehicle.

Particularly, a vehicle battery case according to the present disclosure may include a side portion 200 coupled to the side of a case body 100 so as to protect the side of the vehicle battery.

As illustrated in FIG. 1, the case body 100 may be formed to have an open side, and may have a containing space formed therein such that a vehicle battery is mounted therein. The case body 100 may be mounted below the floor for vehicle weight distribution.

The battery mounted on the vehicle may be connected to the motor of the electric vehicle or to the vehicle manipulation device such that the vehicle can be driven by supplying an electric current.

A pair of side portions 200 may be coupled to both sides of the case body 100, respectively. When the case body 100 is coupled to the lower portion of the vehicle, the side portions 200 may be positioned on sides of the vehicle, respectively, and may be positioned below side chambers of the vehicle, respectively.

Each side portion may include: a lower panel 220 extending to the outside of the vehicle and having a first protrusion 222 formed to protrude upwards; an upper panel 230 extending from the upper side of the lower panel 220 to the outside of the vehicle so as to form a closed section together with the lower panel; and a reinforcement panel 240 disposed between the lower panel 220 and the upper panel 230 so as to reinforce rigidity of the side portion together with the first protrusion 222.

Particularly, each side portion 200 may include a wall panel 210 coupled so as to cover the side of the case body 100. The lower panel 220 and the upper panel 230 may extend from the wall panel 210 to the outside of the vehicle so as to form a closed section together with the wall panel.

The case body 100 has both sides formed to be open. The wall panels 210 included in the side portions 200 may be coupled to cover the open sides of the case body 100.

This prevents external foreign materials from infiltrating into the case body 100 or the vehicle battery, thereby preventing erroneous operations of the battery.

In addition, the lower panel 220 and the upper panel 230 may extend from the outer surface of the wall panel 210 to the outside of the vehicle and may extend in the leftward/rightward direction of the vehicle so as to be positioned below side chambers of the vehicle.

The lower panel 220 may have an end which bends upwards and then extends, thereby including a first bending portion 221. The upper panel 230 may have an end which bends downwards and then extends, thereby including a second bending portion 231. The first bending portion 221 and the second bending portion 231 may be formed to overlap each other. The first bending portion 221 which bends upwards and then extends and the second bending portion 231 may preferably bend perpendicularly to the ground and then extend.

This is advantageous in that sections of the wall panel 210, the lower panel 220, and the upper panel 230 may form a closed section, thereby protecting the battery positioned in the case body 100 when the vehicle undergoes a lateral collision.

Particularly, the first bending portion 221 may be overlappingly coupled so as to be positioned on the outside of the second bending portion 231 such that impacts are distributed and absorbed by the upper panel 230 and the lower panel 220, respectively.

In addition, the lower panel 220 may have a first protrusion 222 extending upwards from the upper surface thereof and extending from the wall panel 210 toward the first bending portion 221.

As illustrated in FIG. 3, the first protrusion 222 may be manufactured in the shape of a bead protruding upwards from the lower panel 220 and extending to the outside of the vehicle.

The first protrusion 221 may improve the rigidity of the lower panel 220 when the vehicle undergoes a lateral collision, thereby improving the rigidity of the closed section formed by the wall panel 210, the lower panel 220, and the upper panel 230. This is advantageous in that the battery positioned in the case body 100 can be protected more safely.

Figure 5:
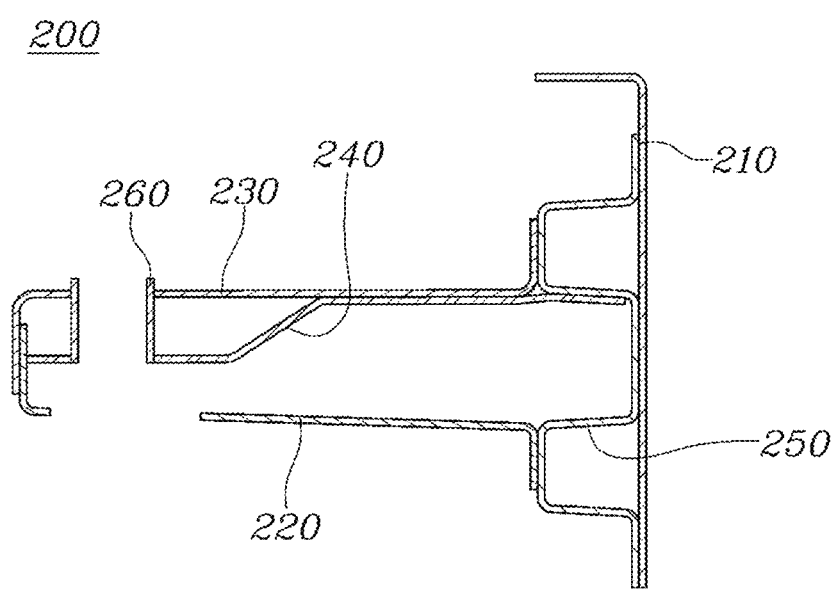
FIG. 5 is a sectional view taken along B-B in FIG. 2.

In addition, as illustrated in FIG. 3 to FIG. 5, a distancing space may be formed between the lower panel 220 and the upper 230 which are spaced apart in the upward/downward direction. A reinforcement panel 240 may be disposed in the distancing space and may extend from the wall panel 210 so as to contact the first bending portion 221 or the second bending portion 231.

This is advantageous in that the reinforcement panel 240 disposed in the distancing space improves the rigidity of the interior of the distancing space together with the first protrusion 222, thereby preventing buckling when the vehicle undergoes a lateral collision.

Each side portion 200 may further include a side panel 250 disposed between the lower panel 220 and the upper panel 230, the side panel 250 including a second protrusion 251 protruding outwards from the wall panel 210 and extending in the forward/backward direction of the vehicle so as to form a closed section.

As illustrated in FIG. 3 and FIG. 4, the side panel 250 may be disposed between the wall panel 210, the lower panel 220, and the upper panel 230, and may have a second protrusion 251 formed to protrude outwards from the wall panel 210 and to form a closed section together with the wall panel 210. The second protrusion 251 may be formed to extend in the forward/backward direction of the vehicle.

The second protrusion 251 may be manufactured by processing the side panel 250 in a corrugated shape through a press process, as illustrated in FIG. 3.

The side panel 250 may form a closed section together with the wall panel 210. Outsides of the upper panel 230, the lower panel 220, and the side panel 240 may form a closed section such that, in the case of a lateral collision, the upper panel 230 and the lower panel 220 primarily absorb the impact, and the side panel 250 secondarily absorbs the impact, thereby protecting the battery in a twofold manner during a lateral collision.

The lower panel 220 and the upper panel 230 may extend outwards from the second protrusion 251.

As illustrated in FIG. 4, the lower panel 220 and the upper panel 230 which extend outwards from the side panel 250 may be famed to extend outwards from the second protrusion 251 formed on the side panel 250.

As illustrated in FIG. 6, if the side portion 200 undergoes a lateral collision of the vehicle, the impact is applied to the first bending portion 221 and the second bending portion 231 of the lower panel 220 and the upper panel 230. The impact may be transferred to the second protrusion 251 through the lower panel 220 and the upper panel 230. The second protrusion 251 may additionally absorb the impact such that no impact or minimized impact is applied to the battery, thereby preventing battery damage.

A pair of second protrusions 251 may be formed and spaced apart one above the other. The lower panel 220 may extend from the lower second protrusion 251, and the upper panel 230 may extend from the upper second protrusion 251.

The lower panel 220 and the upper panel 230 which are spaced apart in the upward/downward direction may extend outwards from the side panel 250. A pair of second protrusions 251 may be formed on the side panel 250 and spaced apart in the upward/downward direction. The lower panel 220 may extend from the lower second protrusion 251, and the upper panel 230 may extend from the upper second protrusion 251.

This is advantageous in that an impact applied from the lower panel 220 is transferred to the lower second protrusion 251, and an impact transferred from the upper panel 230 is transferred to the upper second protrusion 251, thereby distributing the impacts and increasing the degree of impact absorption.

The side panel 250 may further include a connecting portion 252 which connects the pair of second protrusions 251 to each other, and which is connected to the wall panel 210.

The connecting portion 252 may be formed to extend in the upward/downward direction between adjacent ends of the pair of second protrusions 251 spaced apart in the upward/downward direction, thereby connecting the pair of second protrusions 251 to each other.

Accordingly, the side panel 250 may be easily manufactured through a press process, thereby reducing manufacturing costs.

In addition, the connecting portion 252 may be coupled by welding to the wall panel 210 through surface contact, thereby increasing the degree of coupling, and manufacturing costs may be reduced by coupling through welding.

The side panel 250 may further include extension portions 253 which extend from the second protrusions 251 in the upward/downward direction, and which are connected to the wall panel 210.

The extension portions 253 may extend in the upward/downward direction from upper and lower ends of the second protrusions 251 spaced apart in the upward/downward direction, and may be shaped to correspond to the outer surface of the wall panel 210.

The extension portions 253 shaped to correspond to the outer surface of the wall panel 210 may be coupled by welding to the outside of the wall panel through surface contact, and manufacturing costs may be reduced by coupling through welding.

As illustrated in FIG. 6, the extension portions 253 extending in the upward/downward direction may induce upward deformation of the upper second protrusion 251 and downward deformation of the lower second protrusion 251 when the second protrusions 251 absorb an impact.

The lower panel 220 may further include a first flange 223 bending downwards at the inner end thereof so as to be coupled to the second protrusions 251 through surface contact, and the upper panel 230 may further include a second flange 232 bending upwards at the inner end thereof so as to be coupled to the second protrusions 251 through surface contact.

As illustrated in FIG. 3, the lower panel 220 may have a first flange 223 formed to extend after bending downwards at the inner end thereof. The first flange 223 may be formed to correspond to the outer surface of the second protrusions 251. The upper panel 230 may have a second flange 232 formed to extend after bending upwards at the inner end thereof. The second flange 232 may be formed to correspond to the outer surface of the second protrusions 251.

The first flange 223 may contact the outer surface of the lower second protrusion 251 and may be coupled thereto by welding. The second flange 232 may contact the outer surface of the upper second protrusion 251 and may be coupled thereto by welding. The upper panel 230 and the lower panel 220 may be easily manufactured through press molding, and manufacturing costs may be reduced through welding coupling.

Advantageously, the first flange 223 and the second flange 232 contact the outside of the second protrusions 251 such that impacts applied to the upper panel 230 and the lower panel 220 can be stably transferred to the second protrusions 251.

The reinforcement panel 240 may include a third protrusion 241 positioned to correspond to the first protrusion 222 formed on the lower panel 220 and configured to protrude upwards.

As illustrated in FIG. 3 to FIG. 5, a first protrusion 222 may be provided in the distancing space formed between the upper panel 230 and the lower panel 220 and may protrude to the upper portion of the lower panel. The reinforcement panel 240 provided in the distancing space may have a third protrusion 241 formed to surround the first protrusion 222. The third protrusion 241 may be formed in a corrugated shape by pressing the reinforcement panel 240 as illustrated in FIG. 3.

Accordingly, the first protrusion 222 and the reinforcement panel 240 may extend in the distancing space. The first protrusion 222 may be manufactured by pressing a panel when the reinforcement panel 240 is manufactured, thereby improving rigidity of the reinforcement panel 240. This is advantageous in that the first protrusion 222 and the reinforcement panel 240 may together form the rigidity of the distancing space, thereby preventing buckling of the side portion 200 during a lateral collision.

In addition, the third protrusion 241 which protrudes upwards and extends to the outside of the vehicle may be positioned between second protrusions 251 spaced apart in the upward/downward direction as illustrated in FIG. 2.

The second protrusions 251 spaced apart in the upward/downward direction may thus reinforce the upward/downward rigidity of the reinforcement panel 240.

Multiple first protrusions 222 may be disposed to be spaced apart in the forward/backward direction of the vehicle, and multiple third protrusions 241 may be foiled and positioned to correspond to the first protrusions 222.

As illustrated in FIG. 3, multiple first protrusions 222 may be disposed to be spaced apart in the forward/backward direction of the vehicle, and multiple third protrusions 241 may be formed to correspond to the first protrusions 222.

This is advantageous in that the side portion 200 may have a constant level of rigidity, and the battery may be safely protected regardless of the position in which a lateral collision occurs.

The present disclosure may further include multiple pipe members 260 disposed to be spaced part in the forward/backward direction of the vehicle so as to connect with the chassis through the lower panel 220, the upper panel 230, and the reinforcement panel 240.

As illustrated in FIG. 2 and FIG. 3, the pipe members 260 penetrating the lower panel 220, the upper panel 230, and the reinforcement panel 240 may be formed to extend in a side chamber positioned on the upper side of the side member 200.

The pipe members 260 may be advantageous in that, when the vehicle battery case 10 is mounted on the lower portion of the vehicle, the preconfigured position is made accurate, thereby improving work efficiency, and may reinforce rigidity during a lateral collision of the vehicle.

The first protrusion 222 may include a 1-1 protrusion 222a extending from the case body 100 to an end of the lower panel 220 and a 1-2 protrusion 222b extending from the case body toward the pipe member 260s. Multiple 1-1 protrusions 222*a* and multiple 1-2 protrusions 222*b* may be disposed alternately while being spaced apart from each other.

As illustrated in FIG. 3, the 1-2 protrusions 222*b* may extend from points at which the pipe members 260 are positioned, and the 1-1 protrusions 222*a* may extend from points at which no pipe members 260 exist. Accordingly, the 1-2 protrusions 222*a* may be formed shorter than the 1-1 protrusions 222*a*, and the 1-1 protrusions 222*a* and the 1-2 protrusions 222*b* may be disposed to be alternate with each other.

This is advantageous in that the lower panel may have a constant level of rigidity as the multiple first protrusions 222 have a constant distance of spacing.

In addition, the third protrusions 241 formed on the reinforcement panel 240 may bend downwards near ends of the 1-2 protrusions 222*b*.

FIG. 4 is a sectional view at a point at which a 1-1 protrusion 222*a* is positioned. FIG. 5 is a sectional view at a point at which a 1-2 protrusion 222*b* is positioned.

A third protrusion 241 positioned above the 1-1 protrusion 222*a* may extend straight by the length of extension of the 1-1 protrusion 222*a*. Another third protrusion 241 positioned above the 1-2 protrusion 222*b* may be formed to bend downward from an end of the third protrusion 241.

Accordingly, the third protrusion 241 formed straight may absorb the impact when a collision occurs. The third protrusion 241 bending downwards may be compressed or deformed, when a collision occurs, so as to absorb the impact, thereby effectively protecting the side of the vehicle battery.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

What is claimed is:

1. A vehicle battery case comprising:
a case body in which a vehicle battery is contained; and
a side portion extending in a longitudinal direction of a vehicle and coupled to a side of the case body, thereby protecting a side of the vehicle battery,
wherein the side portion comprises:
a lower panel extending outwards from the case body and having a first protrusion formed to protrude upwards;
an upper panel disposed above the lower panel and extending outwards from the case body so as to form a closed section together with the lower panel;
a reinforcement panel disposed between the upper panel and the lower panel so as to extend outwards from the case body, thereby reinforcing rigidity of the side portion together with the lower panel and the upper panel; and
multiple pipe members penetrating the lower panel, the upper panel, and the reinforcement panel and connecting with a chassis, while being disposed to be spaced apart in forward or backward direction of the vehicle.

2. The vehicle battery case of claim 1, wherein the side portion further comprises a side panel disposed between the lower panel, and the upper panel, the side panel comprising multiple second protrusions bent so as to protrude to an outside of the vehicle.

3. The vehicle battery case of claim 2, wherein the lower panel and the upper panel extend from the multiple second protrusions of the side panel to the outside of the vehicle.

4. The vehicle battery case of claim 3, wherein a pair of second protrusions of the multiple second protrusions are formed to be spaced apart one above the other on the side panel, the lower panel extends from a lower second protrusion of the pair of second protrusions, and the upper panel extends from an upper second protrusion of the pair of second protrusions, the upper second protrusion is spaced above the lower second protrusion.

5. The vehicle battery case of claim 2, wherein an end portion of the upper panel extending from the side panel has a first bending portion that bends downwards, an end portion of the lower panel has a second bending portion that bends upwards, and the first and second bending portions are connected to form a closed section.

6. The vehicle battery case of claim 5, wherein the first bending portion is positioned more outwardly than the second bending portion.

7. The vehicle battery case of claim 1, wherein the reinforcement panel comprises a third protrusion protruding upwards, positioned to correspond to the first protrusion formed on the lower panel, and extending to an outside of the vehicle.

8. The vehicle battery case of claim 7, wherein a plurality of first protrusions is provided and disposed to be spaced apart in the forward or backward direction of the vehicle, and a plurality of third protrusions is formed and positioned to correspond to each of the plurality of first protrusions, respectively.

9. The vehicle battery case of claim 7, wherein the side portion further comprises a side panel disposed between the lower panel, and the upper panel, the side panel comprising multiple second protrusions bent so as to protrude to the outside of the vehicle, and the third protrusion is disposed between a pair of second protrusions of the multiple second protrusions.

10. The vehicle battery case of claim 1, wherein the first protrusion comprises a 1-1 protrusion and a 1-2 protrusion, the 1-1 protrusion extending from the case body to an end of the lower panel and the 1-2 protrusion protruding from the case body toward the pipe members, and a plurality of 1-1 protrusions and a plurality of 1-2 protrusions are provided and disposed alternately while being spaced apart from each other.

11. The vehicle battery case of claim 10, wherein the reinforcement panel comprises third protrusions protruding upwards while being positioned to correspond to the first protrusions formed on the lower panel, at least one third protrusion of the third protrusions positioned above at least one 1-1 protrusion of the plurality of 1-1 protrusions extends by a length of extension of the at least one 1-1 protrusion, and at least one third protrusion of the third protrusions positioned above at least one 1-2 protrusion of the plurality of 1-2 protrusions is formed on a vehicle outside end so as to bend downwards.

12. A vehicle battery case comprising:
a case body in which a vehicle battery is contained; and
a side portion extending in a longitudinal direction of a vehicle and coupled to a side of the case body, thereby protecting a side of the vehicle battery,
wherein the side portion comprises:
a lower panel extending outwards from the case body and having a first protrusion formed to protrude upwards;
an upper panel disposed above the lower panel and extending outwards from the case body so as to form a closed section together with the lower panel;
a reinforcement panel disposed between the upper panel and the lower panel so as to extend outwards from the case body, thereby reinforcing rigidity of the side portion together with the lower panel and the upper panel, wherein the side portion further comprises a side panel disposed between the lower panel, and the upper panel, the side panel comprising multiple second protrusions bent so as to protrude to the outside of the vehicle, and wherein the lower panel and the upper panel extend from the multiple second protrusions of the side panel to the outside of the vehicle.

* * * * *